US007840454B2

(12) United States Patent
Von Helmolt et al.

(10) Patent No.: US 7,840,454 B2
(45) Date of Patent: Nov. 23, 2010

(54) METHODS AND SYSTEMS FOR DYNAMIC CALCULATION OF SAFETY STOCK QUANTITY

(75) Inventors: Hans-Ulrich A. Von Helmolt, Heidelberg (DE); Andreas Huber-Buschbeck, Heiligkreuzsteinach (DE)

(73) Assignee: SAP AG, Walldorf (DE)

( * ) Notice: Subject to any disclaimer, the term of this patent is extended or adjusted under 35 U.S.C. 154(b) by 342 days.

(21) Appl. No.: 12/065,891

(22) PCT Filed: Sep. 7, 2005

(86) PCT No.: PCT/EP2005/054432

§ 371 (c)(1),
(2), (4) Date: Mar. 5, 2008

(87) PCT Pub. No.: WO2007/028418

PCT Pub. Date: Mar. 15, 2007

(65) Prior Publication Data

US 2008/0228604 A1 Sep. 18, 2008

(51) Int. Cl.
*G06F 17/50* (2006.01)
(52) U.S. Cl. .................... 705/29; 705/36 R; 705/22; 705/16
(58) Field of Classification Search .......... 705/29, 705/36 R, 22, 16
See application file for complete search history.

(56) References Cited

U.S. PATENT DOCUMENTS

| 6,064,985 | A | * | 5/2000 | Anderson ............ 705/36 R |
| 6,078,900 | A | * | 6/2000 | Ettl et al. ............ 705/28 |
| 7,089,196 | B2 | * | 8/2006 | Hayes ............ 705/22 |
| 2002/0072956 | A1 | * | 6/2002 | Willems et al. ............ 705/10 |
| 2006/0026072 | A1 | * | 2/2006 | Suguro ............ 705/16 |
| 2006/0282346 | A1 | * | 12/2006 | Kernodle et al. ............ 705/28 |

* cited by examiner

*Primary Examiner*—Vanel Frenel
(74) *Attorney, Agent, or Firm*—Blakely, Sokoloff, Taylor & Zafman, LLP

(57) ABSTRACT

A computer-implemented method and system for calculating a safety stock quantity for several warehouses within an availability check during a delivery process of goods, wherein the safety stock quantity is representative of a quantity of products which is protected by the availability check, wherein the safety stock quantity is a combination of a predetermined safety stock quantity and a calculated safety stock quantity and the calculated safety stock quantity being a combination of the predetermined safety stock quantity, a percentage of the predetermined safety stock quantity, an expected demand quantity and a percentage of the expected demand quantity and wherein the safety stock quantity is calculated within the availability check using the predetermined safety stock quantity, the percentage of the predetermined safety stock quantity, the expected demand quantity and the percentage of the expected demand quantity for the respective delivery process of goods.

20 Claims, 4 Drawing Sheets

METHODS AND SYSTEMS FOR DYNAMIC CALCULATION OF SAFETY STOCK QUANTITY

This is a non-provisional application of International Application No. PCT/EP2005/054432, filed Sep. 7, 2005.

BACKGROUND OF THE INVENTION

The present invention relates generally to methods and systems for managing inventory. More particularly, the present invention relates to methods and systems for managing inventory by determining a safety stock quantity of goods within an availability check of a required quantity of goods.

Today, the success of a business company depends essentially on the requirement that customer demands on goods and/or services be fulfilled precisely, cost-efficiently and in time. Therefore, many companies make use of a supply chain management system to control and optimize their production and delivery processes.

Supply chain management may comprise the process of controlling the flow of goods, services, information and/or finances between the involved parties such as manufactures, suppliers, wholesalers, retailers, and consumers. This process may include, among others, order processing, information feedback, and timely delivering the ordered goods and/or services.

One part of the supply chain management is the administration of the inventory in several warehouses, whereby the warehouses can be located with each participant, e.g. manufacturer, dealer or middleman, which is involved in the supply chain. In this supply chain, a participant can act either as a supplier or as a customer.

Any inventory shortage in the supply chain could have negative effects on the efficiency of the business, including production delays, missed order deadlines or disability to meet customers demand. Therefore, it is a basic task of the administration of the inventory to provide a minimum inventory, called the safety stock quantity, to prevent an inventory shortage in the supply chain.

STATE OF THE ART

In current supply chain management systems the minimum inventory is implemented as a static value for each product or product group. This value does not reflect any change in the customer's behaviour or seasonal fluctuation. Supply chain management systems which additionally provide an availability check of the required quantity of goods, use this static value to determine the available quantity of goods.

SUMMARY OF THE INVENTION

In general, in one aspect, this invention provides a computer-implemented method for calculating a protected safety stock quantity for several warehouses within an availability check during a delivery process of goods, whereby the safety stock quantity is representative of a quantity of products which is protected by the availability check, wherein
  a safety stock indicator indicating whether or not a calculation of the protected safety stock quantity has to be performed is checked,
  a safety stock parameter indicating how a calculation of the protected safety stock quantity has to be performed is checked,
  the protected safety stock quantity being a combination of at least a predetermined safety stock quantity, a percentage of the predetermined safety stock quantity, a expected demand quantity and a percentage of the expected demand quantity,
  the percentage of the predetermined safety stock quantity and the percentage of the expected demand quantity being dependent on a predetermined number of configurable characteristic values,
  the percentage of the predetermined safety stock quantity and the percentage of the expected demand quantity being time-dependent, and
  wherein the protected safety stock quantity is calculated within the availability check using the predetermined safety stock quantity, the percentage of the predetermined safety stock quantity, the expected demand quantity and the percentage of the expected demand quantity for the respective delivery process of goods.

If a protected safety stock quantity has to be calculated, the inventive method provides the possibility to calculate the protected safety stock quantity in many different ways using one or more of the key figures predetermined safety stock quantity, percentage of the predetermined safety stock quantity, expected demand quantity and percentage of the expected demand quantity. The calculation may depend on several parameters like customer type or product location.

Further embodiments of the invention can comprise the following features.

In one embodiment of the invention, there can be implemented the following steps for calculating the protected safety stock quantity:
  a first step of determining and evaluating the safety stock indicator,
  a second step of determining the predetermined safety stock quantity, the percentage of the predetermined safety stock quantity, the expected demand quantity and the percentage of the expected demand quantity, if the evaluated safety stock indicator indicates that a calculation of the safety stock quantity has to be performed, and
  a third step of determining the protected safety stock quantity.

A safety stock indicator indicates whether or not a protected safety stock quantity has to be calculated. Therefore, the inventive method may be used also in systems where a calculation of a protected safety stock quantity it is not necessary.

If a calculation of a protected safety stock quantity is necessary, furthermore, the third step may provide two sub-steps for determining the protected safety stock quantity:
  a first sub-step of evaluating the predetermined safety stock quantity, the percentage of the predetermined safety stock quantity, the expected demand quantity and the percentage of the expected demand quantity, and
  a second sub-step of calculating the protected safety stock quantity.

The protected safety stock quantity is set to zero, if the evaluated values predetermined safety stock quantity, percentage of the predetermined safety stock quantity, expected demand quantity and percentage of the expected demand quantity of the first sub-step are not valid.

Using this equation, the inventive method can be used even if the key figures predetermined safety stock quantity, percentage of the predetermined safety stock quantity, expected demand quantity and percentage of the expected demand quantity are not maintained.

Further, the protected safety stock quantity is set to a combination of the evaluated values predetermined safety stock quantity, percentage of the predetermined safety stock quantity, expected demand quantity and percentage of the expected demand quantity if the evaluated values predetermined safety stock quantity, percentage of the predetermined safety stock quantity, expected demand quantity and percentage of the expected demand quantity of the first sub-step are valid.

Yet further, the protected safety stock quantity can be calculated according to at least one of the following rules:
   protected safety stock quantity is set to zero;
   protected safety stock quantity is set to the predetermined safety stock quantity;
   protected safety stock quantity=predetermined safety stock quantity*percentage of the predetermined safety stock quantity+expected demand quantity*percentage of the expected demand quantity;
   protected safety stock quantity=predetermined safety stock quantity+predetermined safety stock quantity*percentage of the predetermined safety stock quantity+expected demand quantity*percentage of the expected demand quantity;
   protected safety stock quantity=predetermined safety stock quantity+expected demand quantity.

One advantage is that the protected safety stock quantity may be calculated in many different ways depending on various requirements.

In a further embodiment, the predetermined safety stock quantity, the expected demand quantity, the percentage of the predetermined safety stock quantity and the percentage of the expected demand quantity are stored in one or more time series which are used to estimate a demand forecast of required quantities of goods.

If the key figures predetermined safety stock quantity, expected demand quantity, percentage of the predetermined safety stock quantity and percentage of the expected demand quantity are not maintained for a specific time period, the method may use the available stored data to estimate a demand forecast of required quantities of goods. Furthermore, the key figures may vary over the time.

The time series are based on one or more characteristic values, whereby one or more of the characteristic values can be summarized by using collective characteristic values and whereby the collective characteristic values has at least one wildcard at the lower level of the characteristic values.

Using collective characteristic values reduces the number of time series and therefore the maintenance effort for the time series may be reduced.

Furthermore, there can be implemented a step of searching the time series for the required combination of characteristic values.

Further, the step of searching the time series may comprise
   a first step of searching the time series for the required combination of characteristic values, whereby the characteristic value at the lower level will be substituted by a wildcard, and
   a second step of performing the first step of searching, whereby the characteristic value at the next higher level will be additionally substituted by a wildcard, if the search in the first step of searching fails.

In one embodiment, the data of the time series may be loaded from a database into a memory during the first access, whereby the memory is managed by the availability check process.

The availability check process reads the data of the time series from the memory for a further calculation of a safety stock quantity.

Reading the data for the time series from the memory, if the data is yet in the memory, leads to a better performance than reading the data from the database.

In a further embodiment, the invention provides an interface which provides methods for changing the configurable characteristic values to other computer-applications.

The interface further provides methods for changing the monthly demand quantities stored in the time series.

Other computer-applications, e.g. third party supply chain management systems, may access the time series for maintaining the time series using several methods which are provided by the interface.

Furthermore, the invention comprises an apparatus comprising
   a data storage device which stores a plurality of time series;
   means which provides methods for changing a plurality of configurable characteristic values to other computer-applications;
   means for calculating a protected safety stock quantity, whereby the means for calculating a protected safety stock quantity are adapted to perform the following steps:
   determining and evaluating the safety stock indicator;
   determining the predetermined safety stock quantity, the percentage of the predetermined safety stock quantity, the expected demand quantity and the percentage of the expected demand quantity;
   determining the protected safety stock quantity; and
   searching the time series for a required combination of characteristic values.

Furthermore, the invention comprises a computer-readable storage medium comprising computer-executable instructions for performing the method according to the inventive methods, when loaded into a computer system.

Thus, the inventive method provides different ways to calculate a protected safety stock quantity, whereby the calculation may depend on several key figures and on several program parameters e.g. customer type or order type.

BRIEF DESCRIPTION OF DRAWINGS

The accompanying drawings, which constitute a part of this disclosure, illustrate various embodiments and aspects of the present invention and, together with the description, explain the principles of the invention.

In the drawings.

DETAILED DESCRIPTION

In the following, the abbreviation PSQ is used for the term protected safety stock quantity and the abbreviation EDQ is used for the term expected demand quantity.

Figure 1:
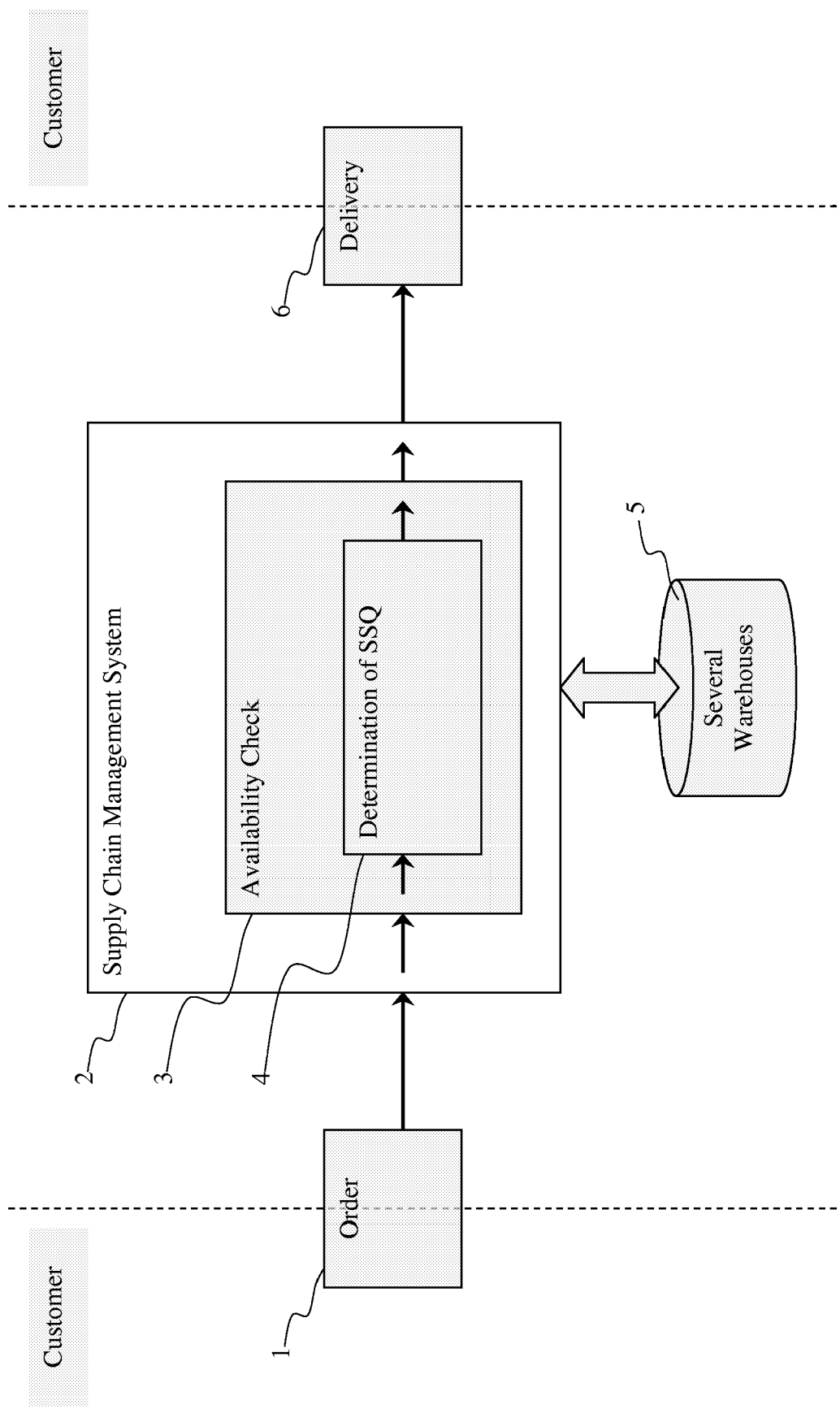
FIG. 1 illustrates a typical sourcing process of goods or products within a supply chain management system using an availability check and a determination of a safety stock quantity.

FIG. 1 shows a typical sourcing process of products. A customer sends an order 1 to a dealer. The order 1 may be an electronic order transmitted by email or a traditional order transmitted by mail. The order comprises at least information about the required product and quantity. The dealer feeds the data about the order 1 into the supply chain management system 2 which processes this order 1 and provides information for the sourcing step 6.

Within the supply chain management system 2, an availability check 3 is performed as to whether the required product and quantity is available in the warehouses 5.

For the availability check 3, the PSQ is taken into account. The PSQ protects a minimum of stock quantity, in order to guarantee a minimum of stock quantity which will not be sold in normal cases. The PSQ is determined by the determination step 4.

Figure 2:
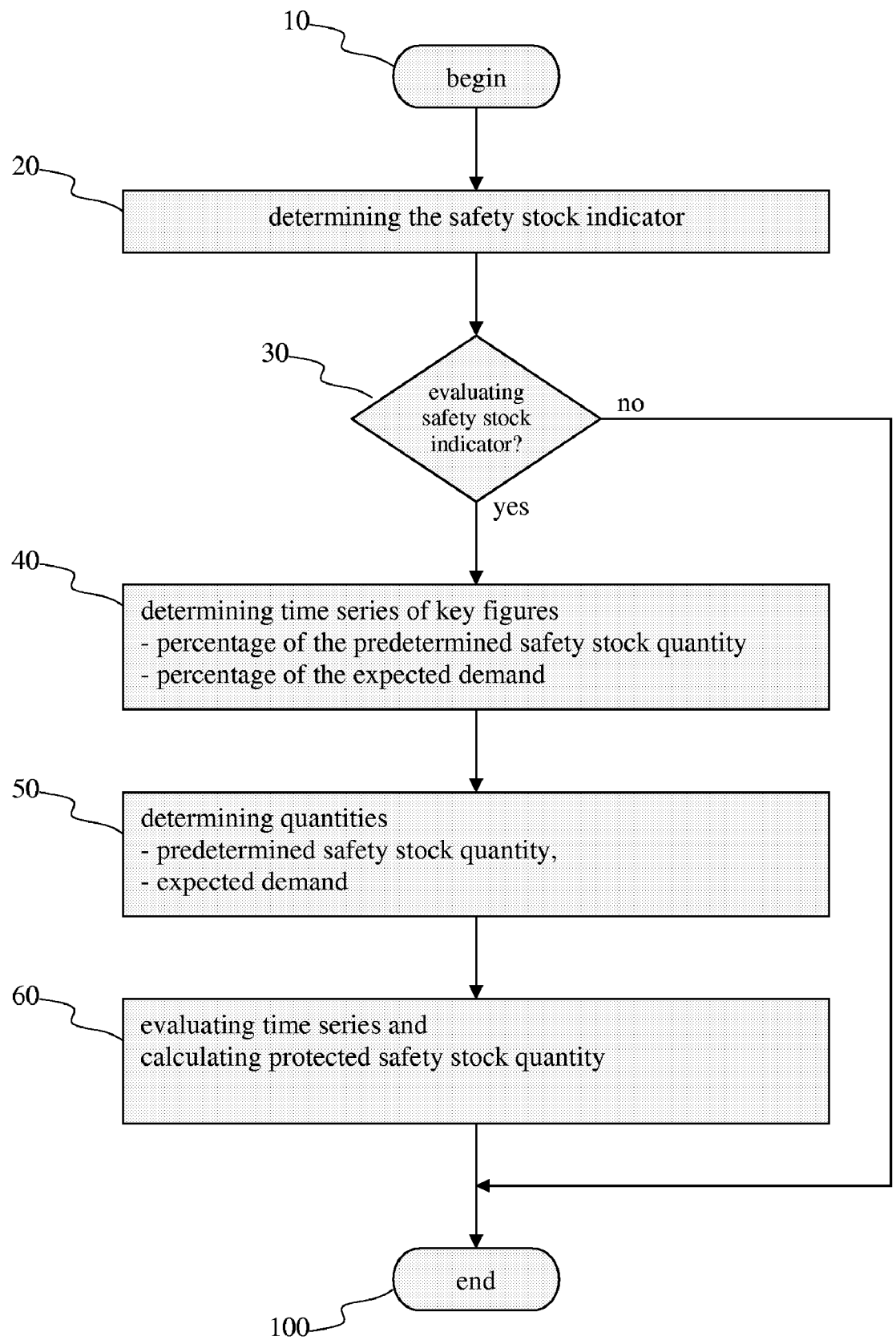
FIG. 2 illustrates an embodiment of a program flow of the present invention.

FIG. 2 shows the inventive method of determining and calculating the PSQ in a supply chain management environment. The method is implemented as a computer program, whereby this computer program can be a part of the above-mentioned supply chain management system. The method provides an interface (not shown in this figure) for input and output parameters. One of the input parameters describes the required quantity of products. Another input parameter describes which product is concerned. One of the output parameter describes whether or not the PSQ was calculated. Another output parameter describes the PSQ itself if the PSQ was calculated.

The method begins with step 10.

In step 20 the safety stock indicator is determined. The safety stock indicator indicates whether or not a calculation of the PSQ has to be performed. In a preferred embodiment the safety stock indicator is stored in the product master data.

After the determination of the safety stock indicator, this indicator is evaluated in step 30. In this embodiment the safety stock indicator can take the values YES or NO or the boolean values TRUE, or FALSE, respectively. If the safety stock indicator takes the value NO the method goes to the step 100—no PSQ calculation will be performed. In the case that the safety stock indicator takes the value YES, the method goes to step 40.

Step 40 performs the determination of several key figures which are required for the calculation of the PSQ. The key figures in this embodiment are a percentage of the predetermined safety stock quantity, and a percentage of the expected demand.

Other embodiments can process more than these key figures. For the expected demand a period specific demand quantity can be used, e.g. a weekly demand, a monthly demand or a quarterly demand. With the percentages the weighting of the predetermined safety stock quantity and the monthly demand during the calculation of the PSQ can be controlled.

These key figures depend on one or more characteristics, e.g. customer type and/or order type and may vary over the time. The key figures are maintained as time series, whereby each meaningful combination of characteristic values has its own time series. Each time series comprises one or more time periods whereby for each time period the key figures are maintained. In this embodiment the time period within a time series is set to 'month'. Other time periods can be used for the period specific demand, e.g. week or quarter. A larger time period will reduce the maintenance effort for the time series. In this manner the key figures can vary from time period to time period.

The above mentioned safety stock indicator can additionally be maintained in these time series. Thus, the decision whether or not a calculation of the PSQ has to be performed can depend also on the viewed time period.

Step 40 is followed by step 50 which determines the quantities for the predetermined safety stock quantity and the expected demand. In one embodiment these key figures are stored in the product master data. In other embodiments they could be stored together with the percentage values in the above mentioned time series. Thus, the calculation of the PSQ can depend also on the determined quantities.

After step 50 the step 60 is performed. In this step 60, the PSQ is calculated. The PSQ calculated depends on the determined values of step 40 and step 50. If the PSQ can be determined the above said output parameter which describes the PSQ is set to the determined PSQ.

Finally the method ends with step 100.

Figure 3:
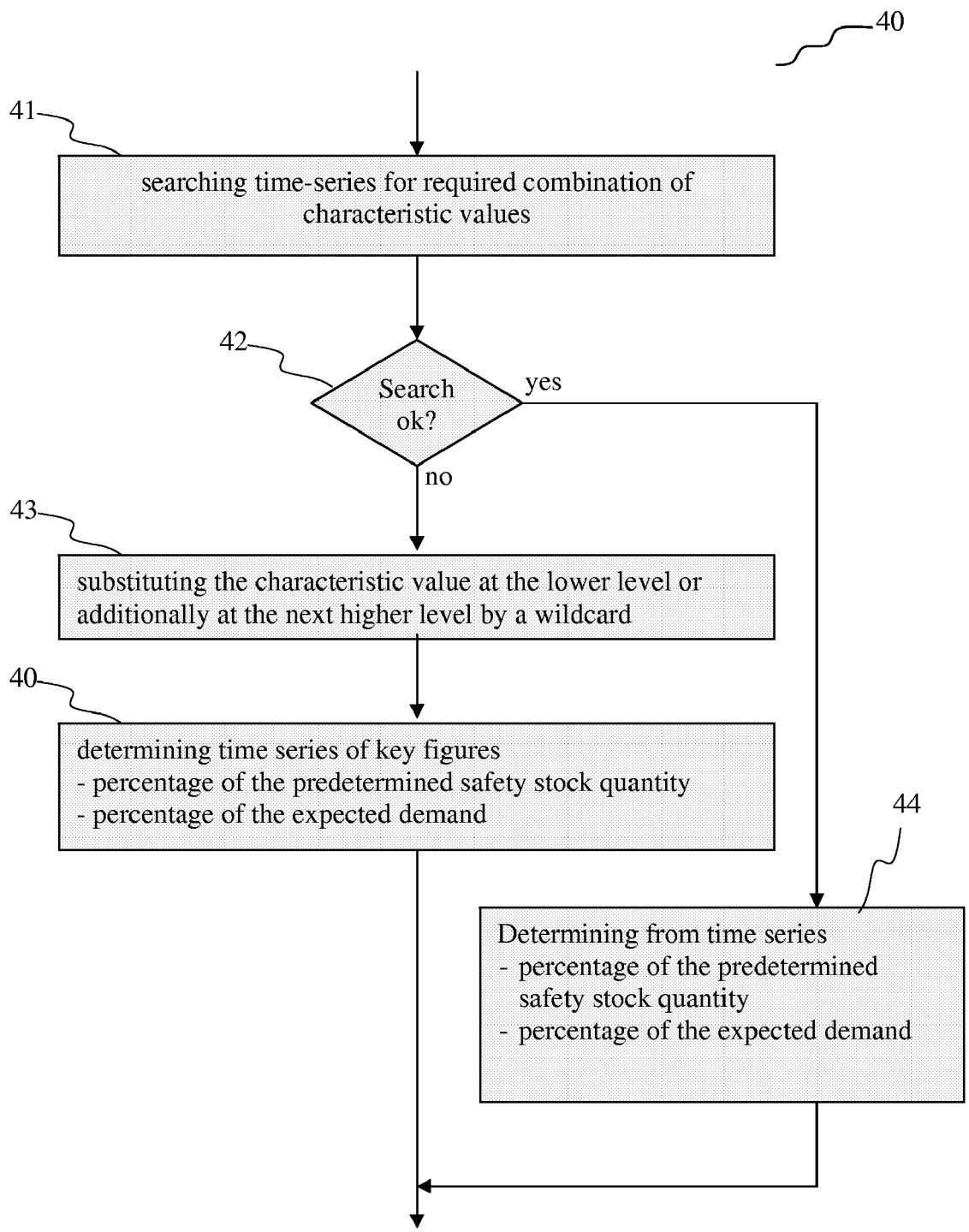
FIG. 3 illustrates the program flow of the determination of the key figures for the calculation of the safety stock quantity according to FIG. 2.

FIG. 3 shows a detailed program flow of step 40 which determines the key figures percentage of the predetermined safety stock quantity and percentage of the expected demand which are required for the calculation of the PSQ in this embodiment. These key figures are stored in time series.

In this embodiment it is not necessary to store time series for all possible combinations of characteristic values. Several combinations of characteristic values can be summarized by using collective characteristics. This will lead to a reduced number of time series and a smaller data volume. Furthermore the effort for maintaining the time series can be reduced.

The first search step 41 comprises searching the time series by considering all characteristic values. In an example with three characteristic values CV1, CV2 and CV3 the characteristic combination is {CV1, CV2, CV3}
(characteristic combination considering all characteristic values)

If this characteristic combination, which is tested in step 42, is found the method goes to step 44. The step 44 reads the key figures stored in the corresponding time series and takes it to calculate the PSQ. This step 44 determines the key figures within the time series according to the requested date. If the corresponding time series is empty or the viewed time period within the time series is not maintained, the values percentage of the predetermined safety stock quantity and percentage of the expected demand are set to zero.

If the characteristic combination is not found, the result of step 42 is NO and the method continues with step 43. In this step 43 the characteristic value of the lowest level will be substituted by a wildcard. In the above example, this leads to the new characteristic combination:

{CV1, CV2, *} (characteristic combination with one wildcard)

After the substitution in step 43 the step 40 is performed in a recursive manner using the new characteristic combination, until a time series for the characteristic combination is found. In each recursion, the next higher characteristic value will be substituted additionally by a wildcard. In the above example the next new characteristic combination within the second recursion is:

{CV1, *, *} (characteristic combination with two wildcards)

If no characteristic combination is found, the PSQ is set to the predetermined safety stock quantity. In another embodiment in this case the PSQ can be set to zero.

In this embodiment the substitution begins with the lowest level and goes to the next higher level by substituting additionally the next higher level by a wildcard:

{CV1, CV2, CV3}→{CV1, CV2, *}→{CV1, *, *}→{*, *, *}

In another embodiment, it could be meaningful to substitute only the viewed level by a wildcard:

{CV1, CV2, CV3}→{CV1, CV2, *}→{CV1, *, CV3}→{*, CV2, CV3}

Other rules for the substitution are also possible.

Step 40 is followed by a step 50 of determining the predetermined safety stock quantity and the expected demand.

Figure 4:
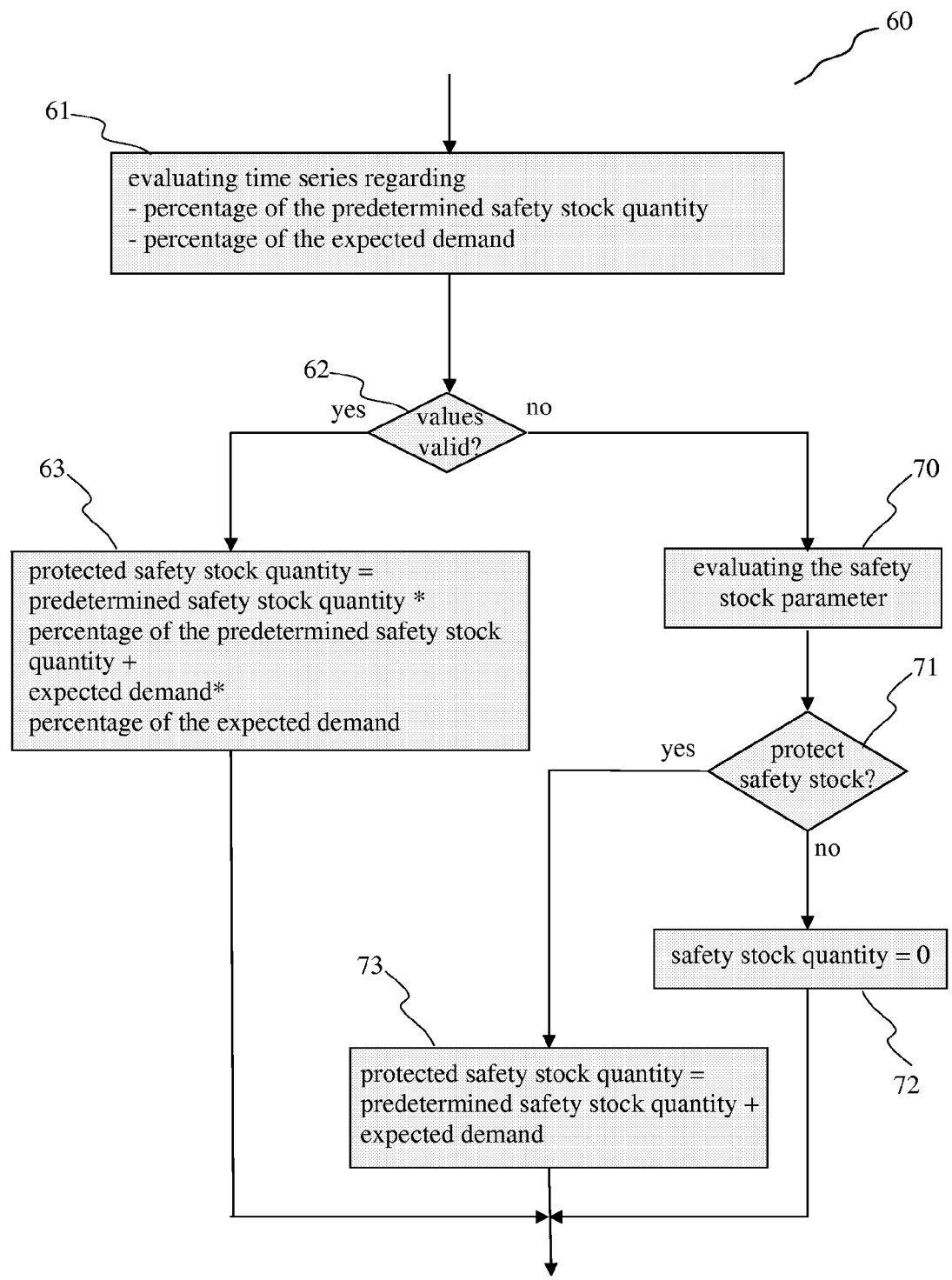
FIG. 4 illustrates a more detailed embodiment of the calculation steps according to FIG. 2.

FIG. 4 shows a more detailed program flow of step 60 shown in FIG. 2. This step 60 begins with step 61 evaluating the time series concerning the percentage of the predetermined safety stock quantity and the percentage of the expected demand. In the following step 62 the evaluated values from step 61 are checked if these are valid. Depending on the result of step 62 the method goes to step 63 or step 70. Step 70 evaluates the safety stock parameter, which controls how the calculation of the PSQ has to be performed.

In the following, the method calculates the PSQ according to one of the following formulas:

$$PSQ=0 \quad \text{(Formula 1)}$$

$$PSQ=\text{predetermined safety stock quantity} \quad \text{(Formula 2)}$$

$$PSQ = \text{predetermined safety stock quantity} * \text{percentage of the predetermined safety stock quantity} + \text{EDQ} * \text{percentage of the EDQ} \quad \text{(Formula 3)}$$

$$PSQ = \text{predetermined safety stock quantity} + \text{predetermined safety stock quantity} * \text{percentage of the predetermined safety stock quantity} + \text{EDQ} * \text{percentage of the EDQ} \quad \text{(Formula 4)}$$

$$PSQ = \text{predetermined safety stock quantity} + \text{EDQ} \quad \text{(Formula 5)}$$

If the values checked in step 62 are valid the method continues with step 63 by calculating the PSQ according to Formula 3.

The step 63 is followed by step 100 in FIG. 2.

If the values checked in step 62 are not valid, the method continues with step 70 by evaluating the safety stock parameter. The following step 71 evaluates which value the safety stock parameter has. The safety stock parameter indicates whether and how the PSQ has to be calculated. If the safety stock parameter indicates that no PSQ has to be calculated in the next step 72 the PSQ is set, according to Formula 1, to zero. If the safety stock parameter indicates that a PSQ has to be calculated the following step 73 calculates the PSQ according to Formula 5.

The steps 72 and 73 are followed by step 100 in FIG. 2.

In other embodiments, instead of Formula 3 the Formula 4 may be used, and instead of Formula 5 the Formula 2 may be used for calculating the PSQ.

The above said time series are used to estimate a demand forecast of required quantities of goods or products. Therefore, in another embodiment, the program flow shown in FIG. 3 can be extended by an additional step, which is not shown in FIG. 3, to performing a demand forecast if a corresponding time series was found but for the viewed time period no EDQ is maintained in the time series. In a further embodiment the percentage of the predetermined safety stock quantity and the percentage of the EDQ can be also calculated using a demand forecast.

In a preferred embodiment the data of the time series is loaded from a database into a memory during the first access. The memory in which the data is loaded is managed by the inventive method. For further calculations of the PSQ the method may read the data of the time series directly from the memory, if the data is yet in the memory. Reading the data for the time series from the memory leads to a better performance than reading the data from the database.

In this embodiment the method provides an interface for changing the configurable characteristic values to other computer-applications. The other computer-applications can be located on different computers, whereby the computers are connected by a communication network, e.g. LAN, WAN or Internet. This interface further provides methods for changing the expected demand or the percentages stored in the time series. With this interface a collaborative planning process between different business companies can be implemented.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

The invention claimed is:

1. A computer-implemented method for calculating a protected safety stock quantity for several warehouses within an availability check during a delivery process of goods, whereby the protected safety stock quantity is representative of a quantity of products which is protected by the availability check, wherein
 a safety stock indicator indicating whether or not a calculation of the protected safety stock quantity has to be performed is checked,
 a safety stock parameter indicating how a calculation of the protected safety stock quantity has to be performed is checked,
 the safety stock quantity being a combination of at least a predetermined safety stock quantity, a percentage of the predetermined safety stock quantity, an expected demand quantity and a percentage of the expected demand quantity,
 the percentage of the predetermined safety stock quantity and the percentage of the expected demand quantity being dependent on a predetermined number of configurable characteristic values,
 the percentage of the predetermined safety stock quantity and the percentage of the expected demand quantity being time-dependent, and
 wherein the protected safety stock quantity is calculated by a computer system within the availability check using the predetermined safety stock quantity, the percentage of the predetermined safety stock quantity, the expected demand quantity and the percentage of the expected demand quantity for the respective delivery process of goods.

2. The method of claim 1, wherein the calculation of the protected safety stock quantity comprising the following steps:
 a first step of determining and evaluating the safety stock indicator,
 a second step of determining the predetermined safety stock quantity, the percentage of the predetermined safety stock quantity, the expected demand quantity and the percentage of the expected demand quantity, if the evaluated safety stock indicator indicates that a calculation of the safety stock quantity has to be performed, and
 a third step of determining the protected safety stock quantity.

3. The method of claim 2, wherein the third step further comprising the following steps:
 a first sub-step of evaluating the predetermined safety stock quantity, the percentage of the predetermined safety stock quantity, the expected demand quantity and the percentage of the expected demand quantity, and
 a second sub-step of calculating the protected safety stock quantity.

4. The method of claim 3, wherein the protected safety stock quantity is set to zero if the evaluated values predetermined safety stock quantity, percentage of the predetermined safety stock quantity, expected demand quantity and percentage of the expected demand quantity of the first sub-step are not valid.

5. The method of claim 3, wherein the protected safety stock quantity is set to a combination of the evaluated values predetermined safety stock quantity, percentage of the predetermined safety stock quantity, expected demand quantity and percentage of the expected demand quantity if the evaluated values predetermined safety stock quantity, percentage of the predetermined safety stock quantity, expected demand quantity and percentage of the expected demand quantity of the first sub-step are valid.

6. The method of claim 5, wherein the protected safety stock quantity being calculated according to at least one of the following rules:
 protected safety stock quantity is set to zero,
 protected safety stock quantity is set to the predetermined safety stock quantity,
 protected safety stock quantity=predetermined safety stock quantity * percentage of the predetermined safety stock quantity+expected demand quantity * percentage of the expected demand quantity,
 protected safety stock quantity=predetermined safety stock quantity+predetermined safety stock quantity * percentage of the predetermined safety stock quantity+ expected demand quantity * percentage of the expected demand quantity,
 protected safety stock quantity=predetermined safety stock quantity+expected demand quantity.

7. The method of claim 1, wherein the predetermined safety stock quantity, the expected demand quantity, the percentage of the predetermined safety stock quantity and the percentage of the expected demand quantity are stored in one or more time series which are used to estimate a demand forecast of required quantities of goods.

8. The method of claim 7, wherein the time series are based on one or more characteristic values, whereby one or more of the characteristic values can be summarized by using collective characteristic values and whereby the collective characteristic values has at least one wildcard at the lower level of the characteristic values.

9. The method of claim 8, wherein the determination of the predetermined safety stock quantity, the percentage of the predetermined safety stock quantity, the expected demand quantity and the percentage of the expected demand quantity stored in the said time series comprises a step of searching the time series for the required combination of characteristic values.

10. The method of claim 9, further comprising:
 a first step of searching the time series for the required combination of characteristic values, whereby the characteristic value at the lower level will be substituted by a wildcard, if the step of claim 9 fails, and
 a second step of performing the first step, whereby the characteristic value at the next higher level will be additionally substituted by a wildcard, if the search in the first step fails.

11. The method of claim 7, wherein the data of the time series is loaded from a database into a memory during the first access, whereby the memory is managed by the availability check process.

12. The method of claim 11, wherein the availability check process reads the data of the time series from the memory for a further calculation of a safety stock quantity.

13. The method of claim 1, further comprising an interface which provides methods for changing the configurable characteristic values to other computer-applications.

14. The method of claim 13, wherein the interface further provides methods for changing the monthly demand quantities stored in the time series.

15. An apparatus comprising:
 a data storage device which stores a plurality of time series;
 means which provides methods for changing a plurality of configurable characteristic values to other computer-applications; and
 means for calculating a protected safety stock quantity;

wherein the means for calculating a protected safety stock quantity are adapted to perform the following steps:

determining and evaluating the safety stock indicator;

determining the predetermined safety stock quantity, the percentage of the predetermined safety stock quantity, the expected demand quantity and the percentage of the expected demand quantity;

determining the protected safety stock quantity; and searching the time series by a computer system for a required combination of characteristic values.

16. A non-transitory computer-readable medium comprising computer-executable instructions which, when executed by a computer system, causes the computer system to perform the operations of:

checking a safety stock indicator indicating whether or not a calculation of a protected safety stock quantity has to be performed;

checking a safety stock parameter indicating how the calculation of the protected safety stock quantity has to be performed; and calculating, by the computer system, the protected safety stock quantity for several warehouses within an availability check during a delivery process of goods using a predetermined safety stock quantity, a percentage of the predetermined safety stock quantity, an expected demand quantity, and a percentage of the expected demand quantity for the respective delivery process of goods, wherein the protected safety stock quantity is representative of a quantity of products which is protected by the availability check, the percentage of the predetermined safety stock quantity and the percentage of the expected demand quantity is dependent on a predetermined number of configurable characteristic values, and the percentage of the predetermined safety stock quantity and the percentage of the expected demand quantity is time-dependent.

17. The non-transitory computer-readable medium of claim 16, wherein calculating, by the computer system, the protected safety stock quantity comprises:

a first step of determining and evaluating the safety stock indicator;

a second step of determining the predetermined safety stock quantity, the percentage of the predetermined safety stock quantity, the expected demand quantity, and the percentage of the expected demand quantity, if the evaluated safety stock indicator indicates that a calculation of the safety stock quantity has to be performed; and a third step of determining the protected safety stock quantity.

18. The non-transitory computer-readable medium of claim 17, wherein the third step further comprising:

a first sub-step of evaluating the predetermined safety stock quantity, the percentage of the predetermined safety stock quantity, the expected demand quantity, and the percentage of the expected demand quantity; and a second sub-step of calculating the protected safety stock quantity.

19. The non-transitory computer-readable medium of claim 18, wherein the protected safety stock quantity being calculated according to at least one of the following rules:

protected safety stock quantity is set to zero, protected safety stock quantity is set to the predetermined safety stock quantity, protected safety stock quantity=predetermined safety stock quantity * percentage of the predetermined safety stock quantity+expected demand quantity * percentage of the expected demand quantity, and protected safety stock quantity=predetermined safety stock quantity+predetermined safety stock quantity * percentage of the predetermined safety stock quantity+ expected demand quantity * percentage of the expected demand quantity.

20. The non-transitory computer-readable medium of claim 16, further comprising an interface which provides methods for changing the configurable characteristic values to other computer-applications.

* * * * *